United States Patent [19]

Shimada et al.

[11] 4,338,013
[45] Jul. 6, 1982

[54] ELECTROMAGNETICALLY DRIVEN SHUTTER

[75] Inventors: Fumio Shimada; Nobuaki Date, both of Kawasaki, Japan

[73] Assignees: Canon Kabushiki Kaisha, Tokyo; Canon Denshi Kabushiki Kaisha, Saitama, both of Japan

[21] Appl. No.: 222,736

[22] Filed: Jan. 5, 1981

[30] Foreign Application Priority Data

Jan. 10, 1980 [JP] Japan .................................... 55-1568

[51] Int. Cl.³ ...................... G03B 9/08; H02K 33/16; H02K 33/18; H01F 7/14
[52] U.S. Cl. .................................. 354/234; 335/219; 335/222; 335/234; 310/29; 310/36
[58] Field of Search ............... 354/133, 234, 235, 271, 354/249; 310/29, 36–39, 49 R; 335/222, 229, 230, 234, 272, 219; 324/125, 144, 146, 151 R, 151 A, 152, 154 R

[56] References Cited

U.S. PATENT DOCUMENTS

| 3,158,796 | 11/1964 | Musgrave | 335/272 X |
| 3,587,014 | 6/1971 | Nador | 335/222 |
| 3,735,303 | 5/1973 | Harden | 335/272 |
| 3,818,690 | 6/1974 | Schwarzschild | 310/49 R X |

Primary Examiner—L. T. Hix
Assistant Examiner—William B. Perkey
Attorney, Agent, or Firm—Toren, McGeady & Stanger

[57] ABSTRACT

In the disclosed shutter, shutter blades are reciprocatable between exposure start positions and end positions. Reciprocative rotating electromagnetic drive sources with stators and rotors reciprocate the shutter blades. Magnetic members on the stator facing the rotors hold the latter at positions corresponding to the blades' start positions and are movable to vary the gaps formed between the rotors and themselves.

6 Claims, 5 Drawing Figures

ELECTROMAGNETICALLY DRIVEN SHUTTER

BACKGROUND OF THE INVENTION

1. Field of the Invention

The present invention relates to a shutter of a camera and particularly to a shutter which has its shutter blades driven by electromagnetic power.

2. Description of the Prior Art

In a conventional shutter in which shutter blades are driven by power of a spring, when shutter blades are set at their positions to start running, mechanical checking means are needed to check said blades at said starting positions against the driving power of the spring.

In a shutter which is driven by electromagnetic power, driving power will not work on its shutter blades until power is supplied to an electromagnetic driving source. But, unless the shutter does not have means to hold the shutter blades at their positions to start running or their positions at which the running is completed, the shutter blades may be inadvertently moved by a shock from an outside of a camera or by a shock derived from operations of a diaphragm or a mirror of a camera itself, etc., thereby resulting in an erroneous exposure.

When mechanical tie-down means are provided to prevent such erroneous operation and exposure, it is necessary to provide a mechanism to release the tie-down means before power is supplied to the electromagnetic driving source, complicating a structure thereof. Also, it is difficult in such an arrangement to adjust timings of a beginning of the electromagnetic driving and a release of the tie-down means.

When a rotating magnet type of electromagnetic drive source is used, it is possible to hold the rotating magnet at a predetermined position by providing a notch window at a fixed yoke or shielding plate and utilize the leakage flux generated thereby. However, the space occupied by an electromagnetic drive source within the camera and the capacity of the power source have limitations. Hence, the drive torque of the electromagnetic drive source is also limited.

Thus, when a permanent magnet is used, it is fully magnetized to obtain the maximum performance therefrom. However, the magnetic powers of such magnetized magnets will vary considerably. Therefore, when shutter blades in a focal plane shutter are held at their start positions, there will often be a difference between the holding power applied to the leading shutter blade and that applied to the follower shutter blades. Thus, the running speeds of the two shutter blades, when they start running will be different. This could result in a situation wherein a correct exposure time cannot be obtained.

Using a complicated electric regulating circuit to eliminate this shortcoming introduces several disadvantages. For example, it raises the manufacturing cost of the system. Furthermore, it requires that the magnetic power of the magnet for leading shutter blades and that for follower shutter blades be made equal to each other. Hence, it becomes necessary that one of the magnets may have its magnetic power reduced. Thus, it is utilized with reduced performance.

SUMMARY OF THE INVENTION

It is an object of the present invention to provide regulating means which can regulate a holding power with simple means when shutter blades are held at their starting positions in a magnetic manner in an electromagnetically driven shutter.

The present invention has such set up that a magnetic member which can be adjusted from outside is provided on a stator of an electromagnetic driving source, and a distance between said member and a rotor is adjusted so that the above-mentioned holding power can be regulated as desired. Examples of the present invention are explained in detail with reference to the attached drawings.

DESCRIPTION OF THE PREFERRED EMBODIMENTS

Figure 1:
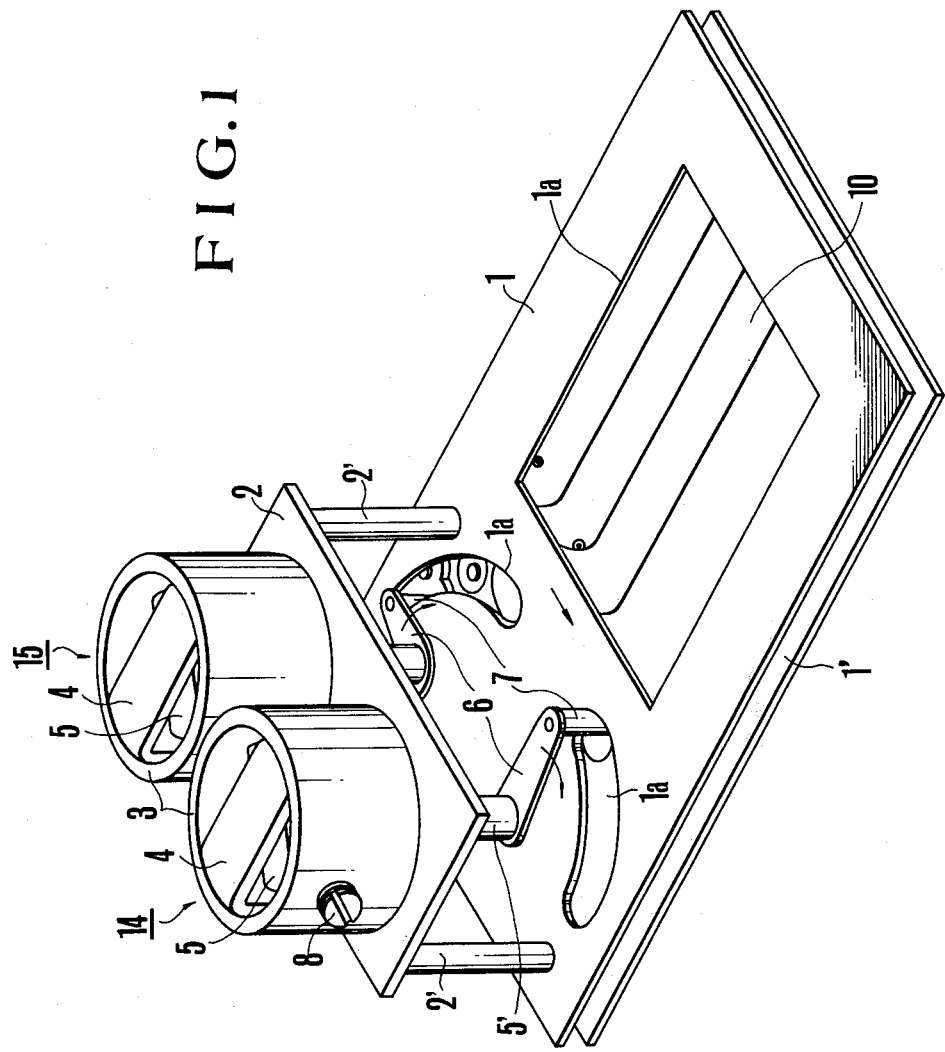
FIG. 1 is an oblique view of an electromagnetically driven shutter to which the present invention is applied.

FIG. 1 shows an example of a focal plane shutter using an electromagnetic driving source of a rotating magnet type. In this drawing, member 1 is a shutter base plate having an exposure opening 1a and holds a group 10 of leading blades and a group of follower blades of a type known from U.S. Pat. No. 4,024,555, etc., respectively composed of a plurality of thin plates and actuating arms and auxiliary arms linkedly to the thin plates, between itself and a cover plate 1'. The drawing shows a state that the shutter is set and leading blades group 10 covers the opening 1a.

A driving part base plate 2 is placed on the shutter base plate 1 with supporting posts 2', and electromagnetic driving sources 14, 15, consisting of yokes 3, field coils 4, etc., as stators and rotating magnets 5 are installed on the base plate 2. Shafts 5' of the rotating magnets 5 are rotatably supported by bearings (not shown in the drawing) provided at the base plate 2, and driving levers 6 having shutter driving pins 7 are fixed at lower parts of the shafts 5'.

The pins 7 go through arc-shaped grooves 1a provided at the shutter base plate 1 and engage with shutter actuating arms which are not shown in the drawing, so that when power is supplied to the coils 4, the pins 7 shift to the direction of arrows following rotation of the magnets 5 to run the leading shutter blades and the follower blades to the direction of arrows for making an exposure.

After an exposure, power is supplied in a reverse direction to the coils 4 thereby returning the shutter blades to their original starting positions shown in the drawing. At this time, the magnets 5 have their magnetic poles placed at positions facing forward ends of screws 8 which are threaded into the yokes 3, and the magnets 5 are stopped in place by the attracting power operating between the magnetic poles and said screws 8, so that the leading shutter blades and follower blades are retained at their starting positions through the above-mentioned driving levers and shutter actuating arms.

The screws 8 are holding members made of magnetic material such as mild steel and are screwed into threaded holes provided at the yokes 3, and gaps between the forward ends of the screws and the external peripheries of the magnets are varied to change a concentration of magnetic flux, so that the holding power can be regulated to the optimum value.

Figure 2:
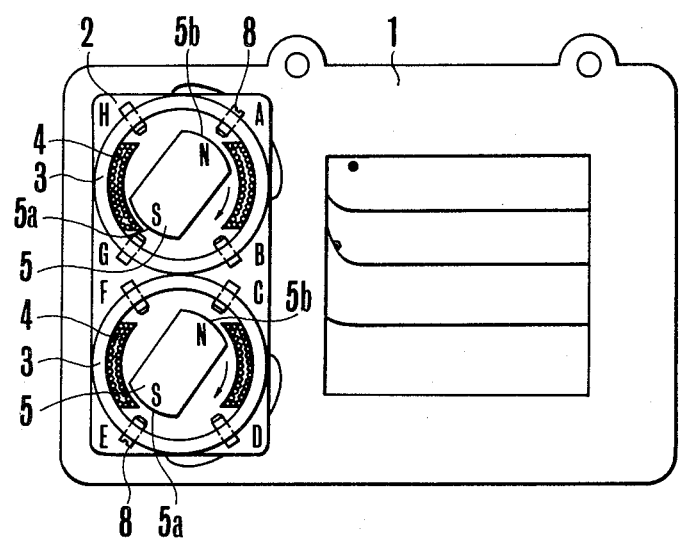
FIG. 2 is a plan of the same.

As shown in FIG. 2, the magnets 5 are magnetized in their longitudinal directions in such a manner that the largest side parts 5a, 5b where magnetic fluxes show largest values face the holding members 8 at positions where the shutter blades start running and positions where the said blades complete the running. In this drawing, A, G, C, E show the positions at which the holding members 8 are to be installed corresponding to the positions where the running is started while B, H, D, F show the positions for the same corresponding to the positions where the running is completed.

Figure 3:
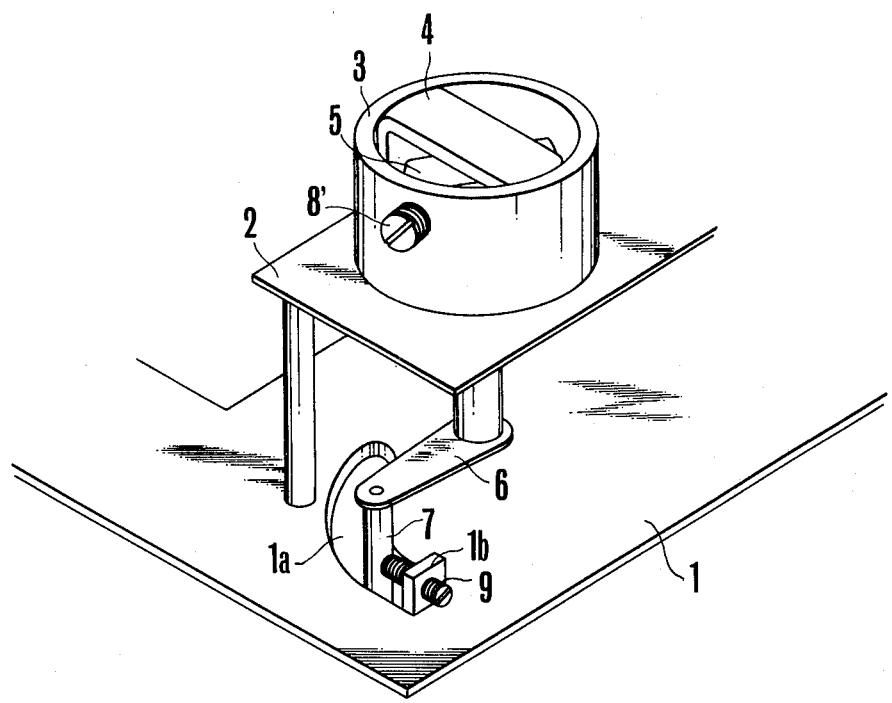
FIG. 3 is an oblique view showing another example.

FIG. 3 shows another example, wherein only one of electromagnetic driving sources is shown. This example has a set up such that control means for the positions at which the running of shutter blades are started are provided separately so that the positions at which the parts are held and a strength of holding power can be separately regulated.

In this drawing, a positional control screw 9 is threaded into a riser part 1b provided at one end of an arc groove 1a of the above-mentioned shutter base plate, and is adjusted so that a forward end of the screw checks a driving pin 7 for controlling a starting position of shutter blades. A screw 8' is similar to the holding member 8 but is provided in this example at somewhat outside of a range of rotating movement of the rotating magnet 5 corresponding to a range of running of the shutter blades, so that the above-mentioned pin 7 is pressed against the positional controlling screw 9 by attracting power working between the member 8' and the magnet 5. The holding power in this example also is regulated by the screw 8' as in the preceding example.

Figure 5:
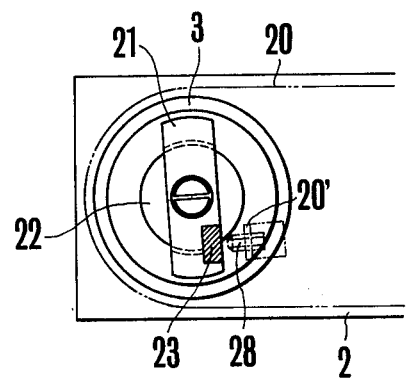
FIG. 5 is a plan of the same.
Figure 4:
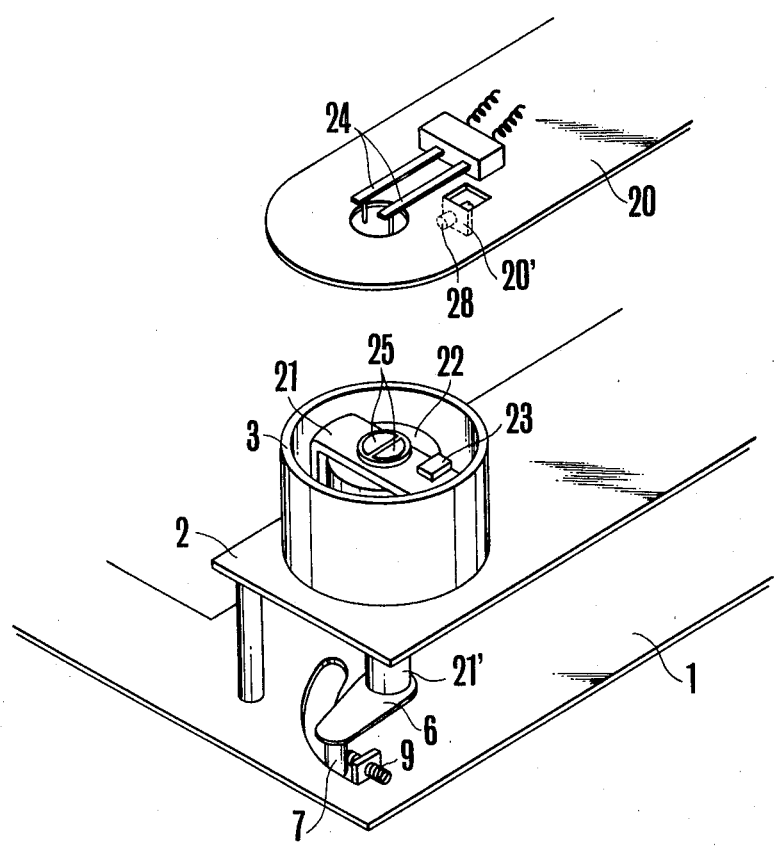
FIG. 4 is an oblique view showing an example in which the present invention is applied to an electromagnetic driving source of a movable coil type.

FIGS. 4 and 5 show an example in which the present invention is applied to an electromagnetic driving source of a movable coil type. In these drawings, same members as shown in preceding examples are identified with the same numbers. What is shown as 3 is a yoke, and 22 is a permanent magnet fixed in place co-axially with the yoke, and they make up a stator of an electromagnetic driving source. A movable coil 21 serves as a rotor and is supported so that it can rotate within a magnetic field generated in a gap between the yoke 3 and the magnet 22. At a lower part of a shaft 21' of said coil the above-mentioned driving lever 6 and the driving pin 7 are fixed for driving shutter blades through shutter actuating arms. Member 9 is the above-mentioned starting position control pin.

What is shown as 20 is a shielding plate positioned for closely fitting on an upper part of the yoke 3 and has thereon a power supply brush 24. Member 25 is a collecting plate on the coil. A permanent magnetic piece 23 is fixedly provided on the coil 21, and a screw 28 is threaded into a bent part 20' of the shielding plate and a forward end of the screw 28 faces the magnetic piece 23 as shown in FIG. 5, so that the shutter blades are held at their starting positions by the attractive power operating between the magnet 23 and the forward end of the screw 28. The screw 28 is made of similar magnetic material as that of the screw 8. The holding power is regulated by changing the gap between the screw 28 and the magnetic piece 23 as in the preceding examples.

The present invention has a magnetic piece provided at a stopping position of a rotor of an electromagnetic driving source corresponding to a starting position of shutter blades in a shutter in which shutter blades are driven by an electromagnetic driving source of a reciprocatingly rotating type, as mentioned above, and an attracting power works between said magnetic piece and a magnet of a rotor to hold the rotor so that a holding power can be regulated by changing a gap between the magnetic piece and the magnet. Therefore, the shutter blades can be held at their starting position by an optimum holding power sufficient to prevent an inadvertent movement of the shutter blades by shocks, etc., yet not impairing running characteristics of the shutter blades as they start to run.

Also even when magnetic power of a magnet for an electromagnetic driving source for driving leading shutter blades and that of a magnet for an electromagnetic driving source for follower shutter blades in a focal plane shutter are different from each other, both shutter blades can be retained at their starting positions with the same levels of power, without degenerating one of the magnets and reducing its power. Thus the present invention has the effect of allowing a correct exposure to be made with a simple structure.

What is claimed is:

1. An electromagnetically driven shutter, comprising:
   shutter blades capable of reciprocative movements between positions to start running for an exposure and positions to complete running;
   electromagnetic driving sources of a reciprocative rotating type for actuating the shutter blades, said driving sources having stators and rotors coupled with the shutter blades; and
   magnetic members positioned on the stators to face positions of the rotors corresponding to the positions of the shutter blades to start running for holding the rotors at said positions with the attracting power between the rotors and the magnetic members, said magnetic members being operable for regulating gaps between themselves and the rotors.

2. An electromagnetically drive shutter, comprising:
   leading shutter blades and follower shutter blades capable of respective reciprocative movements between positions to start running for an exposure and positions to complete the running;
   electromagnetic driving sources of a reciprocative rotating type for respectively actuating said leading and follower shutter blades, said driving sources having rotors made of permanent magnets being coupled with the shutter blades and stators comprising filed coils and yokes; and
   magnetic members protruding into the stators and facing positions of the rotors corresponding to the positions of the shutter blades to start running, said magnetic members being arranged to be able to regulate the gaps between themselves and the rotors and holding the shutter blades at their positions to start running by the attracting power operating between themselves and the rotors.

3. An electromagnetically driven shutter according to claim 2, wherein the magnetic members are formed as screws threaded into the yokes and can be adjusted from outside of the electromagnetic driving source.

4. An electromagnetically driven shutter according to claim 2, in which the shutter has means to control the positions of the rotors corresponding to the positions of the shutter blades to start running, and the magnetic members are provided outside of rotating ranges of the rotors corresponding to operating ranges of the shutter blades.

5. An electromagnetically drive shutter, comprising:

leading shutter blades and follower blades which can make respective reciprocative movements between their positions to start running for an exposure and their positions to complete the running;

electromagnetic driving sources of a reciprocative rotating type to respectively actuate the leading and follower shutter blades, said driving sources having rotors including movable coils which have magnetic pieces attached thereto and are coupled with the shutter blades, and stators comprising permanent magnets and yokes; and magnetic members located so that their positions can be regulated at the stators, facing positions of the rotors corresponding to the positions of the shutter blades to start running, said magnetic members holding the shutter blades at their positions to start running by attracting power operating between the magnetic members and the magnetic pieces of the rotors.

6. An electromagnetically driven shutter according to claim 5, wherein the shutter includes means to control the positions of the rotors corresponding to the positions of the shutter blades to start running, and the magnetic members are positioned outside of the rotating range of the rotors corresponding to the operating range of the shutter blades.

* * * * *